United States Patent
Chiga et al.

(10) Patent No.: US 7,622,222 B2
(45) Date of Patent: Nov. 24, 2009

(54) NONAQUEOUS ELECTROLYTE SECONDARY BATTERY AND MANUFACTURING METHOD THEREOF

(75) Inventors: Takanobu Chiga, Kobe (JP); Yoshinori Kida, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 694 days.

(21) Appl. No.: 11/259,120

(22) Filed: Oct. 27, 2005

(65) Prior Publication Data

US 2006/0093911 A1    May 4, 2006

(30) Foreign Application Priority Data

Oct. 29, 2004    (JP)    ............... 2004-315253

(51) Int. Cl.
 *H01M 4/58*    (2006.01)
(52) U.S. Cl. ............. 429/231.1; 429/231.3; 429/234; 429/218.1; 29/623.1; 29/623.5; 427/58; 427/123; 427/126.3
(58) Field of Classification Search .......... 429/231.1, 429/231.3, 234, 218.1; 29/623.1, 623.5; 427/58, 123, 126.3
See application file for complete search history.

(56) References Cited

U.S. PATENT DOCUMENTS

| | | | | |
|---|---|---|---|---|
| 6,150,053 | A | 11/2000 | Murata et al. | ............. 429/218.1 |
| 6,676,713 | B1 * | 1/2004 | Okada et al. | ............. 429/231.1 |
| 7,135,251 | B2 * | 11/2006 | Cho et al. | ............. 429/231.3 |
| 2003/0082448 | A1 | 5/2003 | Cho et al. | ............. 429/218.1 |

FOREIGN PATENT DOCUMENTS

| | | |
|---|---|---|
| JP | 08-185863 | 7/1996 |
| JP | 10-241691 | 9/1998 |
| JP | 11-191417 | 7/1999 |
| JP | 2003-007299 | 1/2003 |
| JP | 2003-045426 | 2/2003 |

* cited by examiner

*Primary Examiner*—Laura S Weiner
(74) *Attorney, Agent, or Firm*—Kubovcik & Kubovcik

(57) ABSTRACT

A nonaqueous electrolyte secondary battery including a positive electrode 2 containing a positive electrode active material comprising a lithium-transition metal oxide having a layered structure, a negative electrode 1 and a nonaqueous electrolyte, wherein a surface treatment layer containing a compound represented by the chemical formula $M_lP_mO_n$ (wherein M is at least one element which can have a valence of 2, and l, m and n are integers in a range satisfying 2l+5m=2n) is formed on at least a part of the surface of the positive electrode active material.

18 Claims, 1 Drawing Sheet

NONAQUEOUS ELECTROLYTE SECONDARY BATTERY AND MANUFACTURING METHOD THEREOF

FIELD OF THE INVENTION

The present invention relates to a nonaqueous electrolyte secondary battery and a manufacturing method thereof. Especially, the present invention relates to a nonaqueous electrolyte secondary battery capable of improving both cycle characteristics and initial efficiency and a manufacturing method thereof.

BACKGROUND OF THE INVENTION

In recent years, there has been rapid progress in reducing the size and weight of mobile information terminals such as mobile phones, laptop computers and personal digital assistants (PDAs), and high capacities are required in the batteries providing the power that drives them. Nonaqueous electrolyte secondary batteries that are charged and discharged by the transfer of lithium ions between the positive and negative electrodes during charge and discharge are widely used as the power sources for driving the mobile information terminals described above because they have a high energy density and high capacity. Furthermore, these batteries have not been limited to mobile applications such as mobile phones, and in recent years their use has been expanded to applications for mid- to large-size batteries in power tools, electric vehicles and hybrid vehicles.

The use of metallic lithium, an alloy that occludes or releases lithium ions, a carbon material or the like for the negative electrode active material and the use of a lithium-transition metal oxide represented by the chemical formula $LiMO_2$ (where M is a transition metal) for the positive electrode material for the nonaqueous electrolyte secondary batteries described above are known. Cyclic carbonates such as ethylene carbonate and propylene carbonate, cyclic esters such as γ-butyrolactone, chain carbonates such as dimethyl carbonate and ethylmethyl carbonate have been used alone or in combination in the electrolytes for these batteries.

Furthermore, lithium cobalt oxide ($LiCoO_2$) is typically illustrated as a lithium-transition metal oxide for the positive electrode material described above and has been used practically as a positive electrode active material for a nonaqueous electrolyte secondary battery. However, when the lithium-transition metal oxide as typified by lithium cobalt oxide having a layered structure is used alone for the positive electrode active material, changes in the volume of the positive electrode active material during charging and discharging reduce the capacity with repeated charging and discharging. In other words, deterioration of charge-discharge cycle characteristics occurs.

Therefore, the following techniques have been proposed.

(1) Inclusion of magnesium in the lithium-transition metal oxide (Japanese Patent Laid-open Publication No. 8-185863).

(2) Inclusion of 10 atomic % or less of at least one metal element selected from zirconium, magnesium, tin, titanium and aluminum in the lithium-transition metal oxide. (Japanese Patent Laid-open Publication No. 2003-45426).

(3) Surface treatment of the lithium-transition metal oxide with a compound represented by $ALO_k$ (A being at least one element selected from alkali metals, alkaline-earth metals, Group 13 elements, Group 14 elements, transition metals and rare earth elements, L being an element capable of forming a double bond with oxygen, and k being a number in the range from 2 to 4) and among these one represented by $AlPO_k$ (wherein A in $ALO_k$ described above is Al and L is P) (Japanese Patent Laid-open Publication No. 2003-7299).

Each of the techniques (1)-(3) improves the cycle characteristics.

However, the techniques (1)-(3) have a problem of reducing the initial efficiency of the positive electrode active material. Therefore, the requirement for increasing the energy density of a nonaqueous electrolyte secondary battery using materials with high initial charge and discharge efficiency (hereinafter sometimes referred to as "initial efficiency") cannot be satisfied. In recent years, especially, it has been proposed to use active materials having high initial efficiency, such as graphite, as the negative electrode active material to increase the energy density of a nonaqueous electrolyte secondary battery. However, unless the initial efficiency of the positive electrode is improved, the energy density of the battery cannot be increased.

OBJECT OF THE INVENTION

It is an object of the present invention to provide a nonaqueous electrolyte secondary battery capable of inhibiting a reduction in initial efficiency and rapidly improving energy density while improving the cycle characteristics and a manufacturing method thereof.

SUMMARY OF THE INVENTION

To achieve the object described above, a first aspect of the present invention is characterized by a nonaqueous electrolyte secondary battery provided with a positive electrode containing a positive electrode active material comprising a lithium-transition metal oxide having a layered structure, a negative electrode and a nonaqueous electrolyte, wherein a surface treatment layer containing a compound represented by the chemical formula $M_lP_mO_n$ (wherein M is at least one element which can have a valence of 2, and l, m and n are integers in a range satisfying $2l+5m=2n$) is formed on at least a part of surface of the positive electrode active material.

EXPLANATION OF THE ELEMENTS

Figure 1:
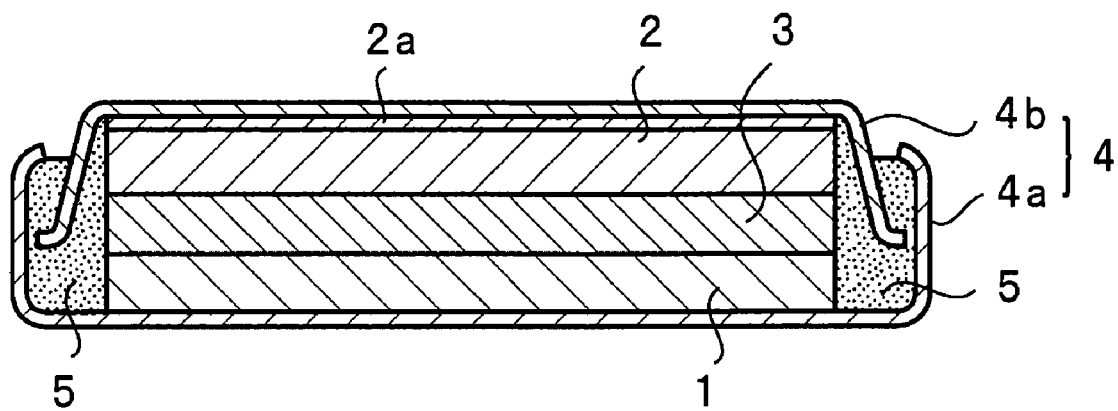
FIG. 1 is a cross-sectional diagram of present invention cell A described in the Example.

1: negative electrode
2: positive electrode
3: separator
4: battery case
4a: bottom part
4b: cover
5: insulating packing

DETAILED EXPLANATION OF THE INVENTION

It is possible to improve the cycle characteristics without a reduction in initial efficiency if a surface treatment layer containing the compound represented by $M_lP_mO_n$ (M being at least one element which can have a valence of 2 and l, m and n being integers in a range satisfying $2l+5m=2n$) is formed on at least part of the surface of the lithium-transition metal oxide having a layered structure. In conventional techniques of surface treatment with compounds containing an element M alone or a compound that includes $AlPO_k$, the cycle characteristics can be improved, but the initial efficiency is deteriorated. However, when an element M which can have a valence of 2 and phosphorus (P) are both included, the cycle characteristics can be improved without reducing the initial efficiency. The reasons for this are described below.

The mechanism for the drop in initial efficiency when only an element M is contained in the positive electrode active material is not clear, but, with an element M alone, it is believed that the element M is dispersed and forms a solid solution in the positive electrode active material during heat treatment and reduces the reversibility of the positive electrode active material. Conversely, if an element M and phosphorus (P) are both included according to the present invention, a treatment layer containing a compound represented by the chemical formula $M_lP_mO_n$ is formed on the surface of the positive electrode active material. Since the phosphate compound represented by the chemical formula $M_lP_mO_n$ is thermally stable, the element M is rigidly bound and present as a phosphate compound, and as a result, the dispersion of the element M into the positive electrode active material is inhibited. For reasons such as this, it is believed that the reduction in the initial efficiency can be inhibited with the constitution described above.

Furthermore, when a lithium-transition metal oxide is immersed in the coating solution or the coating solution is sprayed onto a lithium-transition metal oxide in the formation of a surface treatment layer, if the coating solution is highly acidic (pH of 5 or lower), the lithium-transition metal oxide deteriorates and a lowering of the initial efficiency occurs. As proposed in Japanese Patent Laid-open Publication No. 2003-7299, when the surface is treated with $AlPO_k$, the acidity of the coating solution prepared is extremely high with a pH of about 3, and it is surmised that this causes a reduction in the initial efficiency. Conversely, if, for example, magnesium with a valence of 2 is used, the pH of the coating solution is around 6, and a solution (a solution with low acidity) that is preferable for forming the treatment layer can be obtained. A reason for this is believed to be that when the valence of M in formula (1) is higher (the higher n is), the tendency to form hydroxides is typically stronger. Therefore, the concentration of $H^+$, which causes deterioration of the positive electrode active material, increases, and the acidity increases.

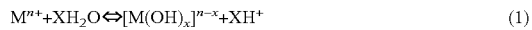

$$M^{n+} + xH_2O \Leftrightarrow [M(OH)_x]^{n-x} + xH^+ \quad (1)$$

On the other hand, elements with a valence of 1, such as lithium, sodium and potassium, are preferable from the standpoint of coating solution acidity, but because they have high reactivity, they may react with the positive electrode active material during heat treatment and M may disperse in the active material.

Therefore, if a treatment layer containing a compound represented by the chemical formula $M_lP_mO_n$ (where M is at least one element capable of having a valence of 2) is formed on the surface of the positive electrode active material, an increase in the acidity of the coating solution can be inhibited, and because the dispersion of M into the active material can be suppressed, a reduction in initial efficiency can be inhibited while the cycle characteristics are improved.

Moreover, $Mg_2P_2O_7$ (M=Mg, l=2, m=2 and n=7), $Mg(PO_3)_2$ (M=Mg, l=1, m=2 and n=6) and $Mg_3(PO_4)_2$ (M=Mg, l=3, m=2 and n=8) are illustrative as examples of $M_lP_mO_n$ contained in the surface treatment layer. Furthermore, the surface treatment layer according to the present invention may contain two or more types of $M_lP_mO_n$ and may also contain compounds other than the compound represented by $M_lP_mO_n$ which result from reactions between the lithium-transition metal oxide and the $M_lP_mO_n$. Additionally, coating of at least a part of the surface of the lithium-transition metal oxide is sufficient, and the entire surface need not be coated according to the present invention.

Furthermore, the positive electrode preferably contains a conductive agent. A carbon material such as graphite, carbon black or the like is preferably used as the conductive agent. The amount of the carbon material is preferably not greater than 7% by mass of the total amount of the positive electrode active material, conductive agent and binder, and not greater than 5% by mass is especially preferable. The reason for regulating the amount of the conductive agent is that the amount of positive electrode active material is reduced and the capacity of the positive electrode is reduced if the amount of the conductive agent is excessively increased.

The invention in a second aspect of the present application is characterized in that the lithium-transition metal oxide in the first aspect of the invention contains cobalt.

Lithium-nickel cobalt composite oxides ($LiNi_{1-x}Co_xO_2$), lithium cobalt oxide ($LiCoO_2$), substitutions of other transition metals for the nickel and cobalt in these, ones where cobalt and, further, manganese are substituted for the nickel and ones where nickel or manganese is substituted for the cobalt are illustrative as examples of lithium-transition metal oxides containing cobalt with a layered structure for use as the positive electrode active material.

The invention in a third aspect of the present application is characterized in that the element M described in the first and second aspects of the invention is magnesium.

In the surface treatment layer containing the compound represented by the chemical formula $M_lP_mO_n$, the element M is at least one element which can have a valence of 2, and magnesium (Mg), calcium (Ca), strontium (Sr), barium (Br), manganese (Mn), iron (Fe), cobalt (Co), nickel (Ni), copper (Cu), zinc (Zn) and the like are illustrated as element M. Among these, magnesium (Mg) is especially preferred.

The reason for this is that during heat treatment, some of the compound represented by $M_lP_mO_n$ and the lithium-transition metal oxide must react to rigidly form the treatment layer on the surface of the active material, but when magnesium is used as the element M, the radius of the magnesium ions is small. Since they are easily diffused in the solid, the reactivity is high, and the surface treatment layer can bind rigidly to the positive electrode active material.

The invention in a fourth aspect of the present invention is characterized in that the amount of the element M in the first to third aspects of the invention is maintained in the range of 0.01-10 atomic % of the total amount of the transition metal in the lithium-transition metal oxide.

The reason for maintaining the amount of the element M is that the positive electrode discharge capacity will be reduced because of a reduction in the amount of positive electrode active material if the amount of element M exceeds 10 atomic %. On the other hand, the amount of $M_lP_mO_n$ will be insufficient and the effect of improving the cycle characteristics with the surface treatment will not be exhibited sufficiently if amount of element M is less than 0.01 atomic %.

Moreover, in consideration of the above, it is especially preferable for the amount of the element M to be in the range of 0.05-5 atomic % of the total transition metal content in the lithium-transition metal oxide.

The invention in a fifth aspect of the present invention is characterized in that the lithium-transition metal oxide with a layered structure in the first to fourth aspects of the invention is lithium cobalt oxide.

According to the constitution described above, the cycle deterioration is greater with lithium cobalt oxide than with lithium manganese oxide, which has a spinel structure, or layered lithium-nickel cobalt manganese oxide if the previously described lithium-transition metal oxide with the layered structure is lithium cobalt oxide. Therefore, the effect of the surface treatment layer containing a compound represented by the chemical formula $M_lP_mO_n$ is greater.

Furthermore, to achieve the object described above, the invention in a sixth aspect of the present invention is a manufacturing method for a nonaqueous electrolyte secondary battery characterized by a first step where a solution containing an element M (M being at least one element which can have a valence of 2) and an element P is applied to the surface of the positive electrode active material formed from a lithium-transition metal oxide with a layered structure and a second step where a treatment layer containing a compound represented by the chemical formula $M_lP_mO_n$ (l, m and n being integers in a range satisfying 2l+5m=2n) is formed on at least a part of the surface of the positive electrode material.

If the manufacturing method is as described above, a treatment layer containing a compound represented by the chemical formula $M_lP_mO_n$ is easily formed on at least part of the surface of the positive electrode active substance.

As methods for applying the solution containing element M (M being at least one element which can have a valence of 2) and element P to the surface of the positive electrode active material in the first step, there are immersion with mixing following the addition of a lithium-transition metal oxide powder to a predetermined amount of the coating solution; spraying, where a predetermined amount of the coating solution is sprayed on the lithium-transition metal oxide powder surface; and other coating methods typically used in this field. More specifically, any method may be used if a compound containing $M_lP_mO_n$ is formed on the surface of the positive electrode active material after heat treatment. However, the immersion and spray methods described above are preferred from the standpoint of productivity.

Furthermore, water or alcohols such as methanol, ethanol and isopropanol, or acetone may be used as the solvent when preparing the coating solution. However, water, which has high productivity and is inexpensive, is preferable among these. Moreover, "coating solution" according to the present invention means all uniform liquid states of solution or liquid states of suspension.

The invention in a seventh aspect of the present invention is characterized in that a combination of a solution containing a compound containing element M and a solution containing a compound containing element P or a solution containing a compound containing both element M and element P is used as the solution containing element M (M being at least one element which can have a valence of 2) and element P in the invention in the sixth aspect of the invention.

When either of the solutions described above is used, it is possible to form the treatment layer containing a compound represented by the chemical formula $M_lP_mO_n$ on at least part of the surface of the positive electrode active material following heat treatment in the second step.

The invention in an eighth aspect of the present invention is characterized in that a heat treatment time of 1-20 hours and a temperature in the range of 200-1000° C. are used in the second step of the method of the sixth and seventh aspects of the invention.

The reason for the use of these conditions is that when the heat treatment temperature and time are below these ranges, the surface treatment layer is not formed sufficiently, and conversely, when the heat treatment temperature and time exceed these ranges, a problem of the compound containing $M_lP_nO_n$ on the surface of the active material diffusing into the active material and reducing the capacity arises. Moreover, a heat treatment temperature in the range of 400-800° C. is especially preferable because of these considerations.

The atmosphere in the heat treatment is not particularly limited. However, from the standpoint of cost, the heat treatment is preferably carried out in air.

The invention in a ninth aspect of the present invention is characterized in that the pH of the solution containing element M (M being at least one element which can have a valence of 2) and element P in the sixth to eighth aspects of the invention is 6 or greater and less than or equal to 9.

According to the description above, when a lithium-transition metal oxide is immersed in the coating solution or the coating solution is sprayed onto a lithium-transition metal oxide to form a surface treatment layer, if the coating solution is highly acidic (pH of 5 or lower), the lithium-transition metal oxide deteriorates and a lowering of the initial efficiency occurs. Therefore, according to the constitution described above, deterioration of the lithium-transition metal oxide is inhibited and the lowering of the initial efficiency is suppressed if the pH of the solution containing element M and element P is controlled to be 6 or greater and less than or equal to 9.

The invention in a tenth aspect of the present invention is characterized in that the lithium-transition metal oxide with a layered structure in the sixth to ninth aspects of the invention is lithium cobalt oxide.

The reason for this preference is the same that for the fifth aspect of the present invention as described above.

DESCRIPTION OF PREFERRED EMBODIMENTS

The present invention is explained in further detail below. It is of course understood that the present invention is not limited to the preferred embodiment described below, but can be modified without departing from the scope and spirit of the appended claims.

(Preparation of the Positive Electrode Active Material)

After $Li_2CO_3$ and $CO_3O_4$ were mixed at an Li:Co mole ratio of 1:1 using an Ishikawa mixing mortar, lithium cobalt oxide ($LiCoO_2$) powder was obtained by pulverization after heat treatment for 24 hours at 850° C. in an air atmosphere.

Surface treatment of the lithium cobalt oxide powder obtained was carried out as follows. First, 0.1457 g of $MgCl_2$ and 0.2425 g of $(NH_4)_2HPO_4$ were dissolved in 160 g of pure water to obtain a coating solution. The pH of this coating solution was 6.7. Next, 15 g of lithium cobalt oxide was added to the coating solution described above and agitated and the solution was heated while being agitated and the solvent volatilized. A positive electrode active material with a treatment layer containing magnesium phosphate in the form of $Mg_2P_2O_7$ and $Mg(PO_3)_2$ was formed on the surface by heat treating the powder obtained for five hours in air at 700° C. Moreover, the magnesium content in the surface treatment layer was 1 atomic % of the total amount of the transition metal (cobalt) in the lithium cobalt oxide.

(Preparation of the Positive Electrode)

After adding carbon black as a conductive agent, vinylidene polyfluoride as a binder and N-methyl-2-pyrrolidone as a dispersion medium to the positive electrode active material obtained as described above such that the ratio by mass of the active material, conductive agent and binder was 90:5:5, a positive electrode slurry was prepared by kneading. After the positive electrode slurry thus prepared was applied to an aluminum foil as a current collector, the positive electrode was prepared by drying followed by rolling using a pressure roller and cutting out of a circular disk having a diameter of 20 mm. The carbon material content was 5% by mass of the total amount of the positive electrode active material, the conductive agent and the binder.

(Preparation of the Negative Electrode)

The negative electrode was prepared by stamping a disk 20 mm in diameter from a rolled lithium plate with a predetermined thickness.

(Preparation of the Electrolyte)

The nonaqueous electrolyte was formed as a solution having a concentration of lithium hexafluorophosphate ($LiPF_6$) of 1.0 mole per liter in a mixed solvent of ethylene carbonate and ethylmethyl carbonate in a ratio of 30:70 by volume. Furthermore, vinylene carbonate was added in a proportion of two parts by mass as an additive to 100 parts by mass of this nonaqueous solution.

(Preparation of the Test Cell)

A separator 3 comprising a porous polyethylene film was sandwiched between the positive electrode 2 prepared as described above and the negative electrode 1 as shown in FIG. 1. Next, along with bringing the positive electrode current collector 2a into contact with the upper cover 4b of the battery case 4 for the test cell, the negative electrode 1 described above was brought into contact with the bottom part of the battery case 4. These were accommodated within the battery case 4, and the upper cover 4b described above and the bottom part 4a were electrically insulated from each other with insulating packing 5 to prepare a test cell (nonaqueous electrolyte secondary battery) according to the present invention.

EXAMPLE

The test cell explained in the preferred embodiment of the present invention described above was used as an example. The test cell prepared in this manner was called present invention cell A.

Comparative Example 1

A test cell was prepared in the same manner as in the Example described above except that a coating solution without the addition of $(NH_4)_2HPO_4$ was used in the surface treatment process for the positive electrode active material. The test cell prepared in this manner is called comparative cell X1 in the following.

Comparative Example 2

A test cell was prepared in the same manner as in the Example described above except that the surface treatment process for the positive electrode material was conducted as follows.

The test cell prepared in this manner is called comparative cell X2 in the following.

First, 2.31 g of $Al(NO_3)_3 \cdot 9H_2O$ and 0.97 g of $(NH_4)_2HPO_4$ were dissolved in 160 ml of pure water. Since the pH of this solution was 2.3, the precipitate obtained was dispersed once again in pure water to lower the acidity after being recovered by centrifugal separation, and this solution was used as the coating solution. The pH of this coating solution was 2.7. Next, after 25 g of lithium cobalt oxide ($LiCoO_2$) was added to the coating solution described above and agitated, solid-liquid separation was carried out by suction filtration. Next, a positive electrode active material with a surface treatment layer containing aluminum phosphate was prepared by heat treating the powder obtained for five hours in air at 700° C.

Comparative Example 3

A test cell was prepared in the same manner as in the Example except that no surface treatment was carried out in the preparation of the positive electrode active substance, and only lithium cobalt oxide was used for the positive electrode active substance.

The test cell prepared in this manner is called comparative cell X3 in the following.

(Experiment)

The initial efficiency, 28th cycle charge/discharge efficiency and the capacity maintenance rate were investigated for the present invention cell A and comparative cells X1-X3 described above, and the results are shown in Table 1. The initial efficiency, 28th cycle charge/discharge efficiency and capacity maintenance rate were calculated as follows.

[Calculation of Initial Efficiency]

First, each test cell was charged until it reached a voltage of 4.3 V using a constant current of 0.75 mA/cm² at 25° C.; furthermore, the initial charging capacity $C_1$ (mAh) was measured by charging the test cell again until it reached a voltage of 4.3 V using a constant current of 0.25 mA/cm².

Subsequently, the initial discharge capacity $D_1$ (mAh) of the test cells was measured by discharging them until they reached a voltage of 2.75 V at a constant current of 0.75 mA/cm².

Finally, the ratio of the initial discharge capacity $D_1$ (mAh) to the initial charging capacity $C_1$ (mAh), that is, the initial efficiency $E_1$ (%) was calculated using the following equation (1).

$$E_1 = D_1/C_1 \times 100 (\%) \tag{1}$$

[Calculation of 28th Cycle Charge/Discharge Efficiency]

Charging and discharging for 28 cycles were carried out under the same conditions as those for charging and discharging to calculate the initial efficiency described above, and the discharge capacity $D_{28}$ (mAh) and the charging capacity $C_{28}$ (mAh) were measured at the 28th cycle.

Next, the ratio of the discharge capacity $D_{28}$ (mAh) after the 28th cycle to the charging capacity $C_{28}$ (mAh) after the 28th cycle, that is, the charge/discharge efficiency $E_{28}$ (%) after the 28th cycle was calculated using equation (2) below.

$$E_{28} = D_{28}/C_{28} \times 100 (\%) \tag{2}$$

[Capacity Maintenance Rate After 28 Cycles]

The ratio of discharge capacity $D_{28}$ (mAh) after 28 cycles to initial discharge capacity $D_1$ (mAh), that is, the capacity maintenance rate $T_{28}$ (%) after 28 cycles was determined using the following equation (3).

$$T_{28} = D_{28}/D_1 \times 100 (\%) \tag{3}$$

The higher the charge/discharge efficiency $E_{28}$ and the capacity maintenance rate $T_{28}$ after 28 cycles, the more superior are the cycle characteristics, and this indicates that a battery having a high capacity has been obtained even after being repeatedly charged and discharged.

TABLE 1

| Battery | Positive Active Material | Surface Treatment Layer | Initial Efficiency $E_1$ (%) | Charge Discharge Efficiency after 28 cycles $E_{28}$ (%) | Capacity Maintenance Rate after 28 cycles $T_{28}$ (%) |
|---|---|---|---|---|---|
| Battery A | Lithium Cobalt Oxide | Magnesium Phosphate | 97.3 | 99.2 | 100 |
| Comp. Battery X1 | | Magnesium | 96.7 | 98.8 | 100 |
| Comp. Battery X2 | | Aluminum Phosphate | 96.8 | 98.8 | 94 |
| Comp. Battery X3 | | None | 97.5 | 98.3 | 92 |

As can be seen from Table 1, it is understood that, notwithstanding the superior initial efficiency exhibited by the comparative cell X3 that used only lithium cobalt oxide (without a surface treatment layer) for the positive electrode active material, the drop in the charge/discharge efficiency and the capacity maintenance rate after the cycles were large, and the cycle characteristics were extremely poor. Furthermore, in comparative cell X2 where a surface treatment layer on the lithium cobalt oxide was formed from aluminum phosphate, the cycle characteristics were somewhat improved, but there was a reduction in initial efficiency. With comparative cell X1 where the lithium cobalt oxide contained magnesium, there was some improvement in the cycle characteristics, but there was a drop in the initial efficiency.

Conversely, the present invention cell A, where a treatment layer containing magnesium phosphate was formed on the lithium cobalt oxide surface, exhibited an initial efficiency equivalent to that for comparative cell X3, but it was found to have cycle characteristics that were equal to or greater than comparative cells X1 and X2. This is believed to be due to the following reasons.

Specifically, with comparative cell X3, the cycle characteristics dropped because no surface treatment layer was formed. With comparative cell X2, the lithium cobalt oxide deteriorated because the acidity of the coating solution was high, and along with the improvement in the cycle characteristics being insufficient, the initial efficiency decreased. With comparative cell X2, the initial efficiency dropped because the magnesium diffused in the positive electrode active material. Conversely, with the present invention cell A, the diffusion of the magnesium into the positive electrode active material was inhibited because the treatment layer containing magnesium phosphate was formed on the surface of the positive electrode active material during heat treatment, and the surface treatment layer contains phosphorus. In addition, it is possible to control the deterioration of the lithium cobalt oxide by reducing the acidity of the coating solution using magnesium with a valence of 2. It is concluded that because of this it is possible to inhibit the reduction in initial efficiency while improving the cycle characteristics.

From the results above, it is understood that the reduction in the initial efficiency found when a conventional element M was added alone or when the surface was processed with a compound containing $AlPO_k$ can be suppressed by the formation of a compound containing $M_lP_mO_n$ (M being at least one element which can have a valence of 2) on the surface of the lithium-transition metal oxide with a layered structure, and the cycle characteristics can be improved.

The negative electrode material used in the present invention is not limited to the metallic lithium described above, and negative electrode materials that have conventionally been used in nonaqueous electrolyte secondary cells, such as lithium-aluminum alloys, lithium-lead alloys, lithium-silicon alloys, lithium-tin alloys and other lithium alloys, graphite, coke, sintered organic materials and other carbon materials, as well as $SnO_2$, $SnO$, $TiO_2$ and other metal oxides with electric potentials lower than that the positive electrode active material may be used.

The solvents that can be used in the present invention are not limited to the ethylene carbonate and ethyl methyl carbonate described above, and solvents conventionally used in nonaqueous electrolyte secondary cells, such as propylene carbonate, 1,2-butylene carbonate, 2,3-butylene carbonate, vinylene carbonate, vinylethylene carbonate and other cyclic carbonates, γ-butyrolactone, propanesultone and other cyclic esters, diethyl carbonate, dimethyl carbonate and other carbon chain esters, 1,2-dimethoxyethane, 1-2-diethoxyethane, diethyl ether, ethylmethyl ether and other chain ethers, methyl acetate, ethyl acetate, propyl acetate, methyl propionate, ethyl propionate, tetrahydrofuran, 2-methyltetrahydrofuran, 1,4-dioxane, acetonitrile, may be used as solvents. Furthermore, since vinylene carbonate and vinylethylene carbonate form a stable film with superior lithium ion permeability on the surface of the negative electrode and can inhibit the breakdown of other solvents, they may be used accordingly.

The solute for the nonaqueous electrolyte in the present invention is not limited to the $LiPF_6$ described above, and solutes conventionally used in nonaqueous electrolyte secondary batteries, such as $LiBF_4$, $LiCF_3SO_3$, $LiClO_4$, $LiN(C_2F_5SO_2)_2$, $LiN(CF_3SO_2)(C_4F_9SO_2)$ $LiC(CF_3SO_2)_3$, $LiC(C_2F_5SO_2)_3$, $LiAsF_6$, $Li_2B_{10}Cl_{10}$, $Li_2B_{12}Cl_{12}$, and $LiB(C_2O_4)_2$ may be used.

The shape of the battery is not limited to the flat shape mentioned above, and a wide variety of shapes that can be applied to nonaqueous electrolyte secondary batteries, such as cylindrical shapes and rectangular shapes, may be used.

The present invention is not limited to a liquid type battery and may be applied to gel type polymer batteries. As a polymer material, polyether solid polymer, polycarbonate solid polymer, polyacrylonitrile solid polymer, oxetane polymer, epoxy polymer and a copolymer of two or more of these, and crosslinked polymers or PVDF are illustrated, and solid electrolyte that combines these polymer materials, lithium salts and electrolytes in a gel may be used.

ADVANTAGE OF THE INVENTION

The effects of exhibiting superior cycle characteristics and inhibiting a drop in initial efficiency in a nonaqueous electrolyte secondary battery are obtained in the present invention by forming a surface treatment layer containing a compound represented by the chemical formula $M_lP_mO_n$ (M being at least one element which can have a valence of 2 and l, m and n being integers in a range satisfying 2l+5m=2n) on a lithium-transition metal oxide with a layered structure contained in a positive electrode active material.

The present invention may be applied not only to the drive batteries for, mobile telephones, laptop computers, PDAs and other mobile information terminals, but also to the large batteries installed in vehicles, such as electric vehicles and hybrid vehicles.

This application claims priority based Japanese patent application No. 2004-315253 filed Oct. 29, 2004, which is incorporated herein by reference.

What is claimed is:

1. A nonaqueous electrolyte secondary battery comprising a positive electrode, a negative electrode and a nonaqueous electrolyte, the positive electrode comprising a positive electrode active material layer provided on a current collector and the positive electrode active material comprising a lithium-transition metal oxide with a layered structure, wherein a surface treatment layer containing a compound represented by chemical formula $M_lP_mO_n$, wherein M is at least one element which can have a valence of 2, and l, m and n are integers in a range satisfying 2l+5m=2n, is formed on at least a part of a surface of said positive electrode active material prior to forming the positive electrode active material layer.

2. The nonaqueous electrolyte secondary battery according to claim 1, wherein said lithium-transition metal oxide contains cobalt.

3. The nonaqueous electrolyte secondary battery according to claim 2, wherein said element M is magnesium.

4. The nonaqueous electrolyte secondary battery according to claim 3, wherein the amount of said element M is 0.01-10 atomic % of the total amount of transition metal in said lithium-transition metal oxide.

5. The nonaqueous electrolyte secondary battery according to claim 4, wherein said lithium-transition metal oxide with a layered structure is lithium cobalt oxide.

6. The nonaqueous electrolyte secondary battery according to claim 1, wherein said element M is magnesium.

7. The nonaqueous electrolyte secondary battery according to claim 6, wherein the amount of said element M is 0.01-10 atomic % of the total amount of transition metal in said lithium-transition metal oxide.

8. The nonaqueous electrolyte secondary battery according to claim 1, wherein the amount of said element M is 0.01-10 atomic % of the total amount of transition metal in said lithium-transition metal oxide.

9. The nonaqueous electrolyte secondary battery according to claim 1, wherein said lithium-transition metal oxide with a layered structure is lithium cobalt oxide.

10. A manufacturing method of a positive electrode of a nonaqueous electrolyte secondary battery comprising:
    a first step where a solution containing an element M, M being at least one element which can have a valence of 2, and an element P is applied to the surface of a positive electrode active material containing a lithium-transition metal oxide with a layered structure;
    a second step where the positive electrode material of said first step is treated to form a surface treatment layer containing a compound represented by the chemical formula $M_lP_mO_n$ (l, m and n being integers in a range satisfying 2l+5m=2n) on at least part of a surface of the positive electrode material, and
    a third step where the positive electrode material of said second step is mixed with a conductive agent and a binder and the mixture is applied to a current collector and dried to form the positive electrode.

11. The manufacturing method of a nonaqueous electrolyte secondary battery according to claim 10, wherein a combination off a solution containing a compound containing the element M and a solution containing a compound containing the element P or a solution containing a compound containing both element M and element P is used as the solution containing element M and element P.

12. The manufacturing method of a nonaqueous electrolyte secondary battery according to claim 11, wherein pH of the solution that contains said element M and element P is 6 or greater and less than or equal to 9.

13. The manufacturing method of a nonaqueous electrolyte secondary battery according to claim 10, wherein in said second step the positive electrode material of said first step is heat treated at a temperature in a range of 200-1000° C. for 1-20 hours.

14. The manufacturing method of a nonaqueous electrolyte secondary battery according to claim 13, wherein pH of the solution that contains said element M and element P is 6 or greater and less than or equal to 9.

15. The manufacturing method of a nonaqueous electrolyte secondary battery according to claim 14, wherein a combination of a solution containing a compound containing the element M and a solution containing a compound containing the element P or a solution containing a compound containing both element M and element P is used as the solution containing element M and element P.

16. The manufacturing method of a nonaqueous electrolyte secondary battery according to claim 15, wherein said lithium-transition metal oxide having a layered structure is lithium cobalt oxide.

17. The manufacturing method of a nonaqueous electrolyte secondary battery according to claim 10, wherein pH of the solution that contains said element M and element P is 6 or greater and less than or equal to 9.

18. The manufacturing method of a nonaqueous electrolyte secondary battery according to claim 10, wherein said lithium-transition metal oxide having a layered structure is lithium cobalt oxide.

* * * * *